Jan. 9, 1951   H. C. GRANT, JR   2,537,051
VALVE
Filed June 8, 1946
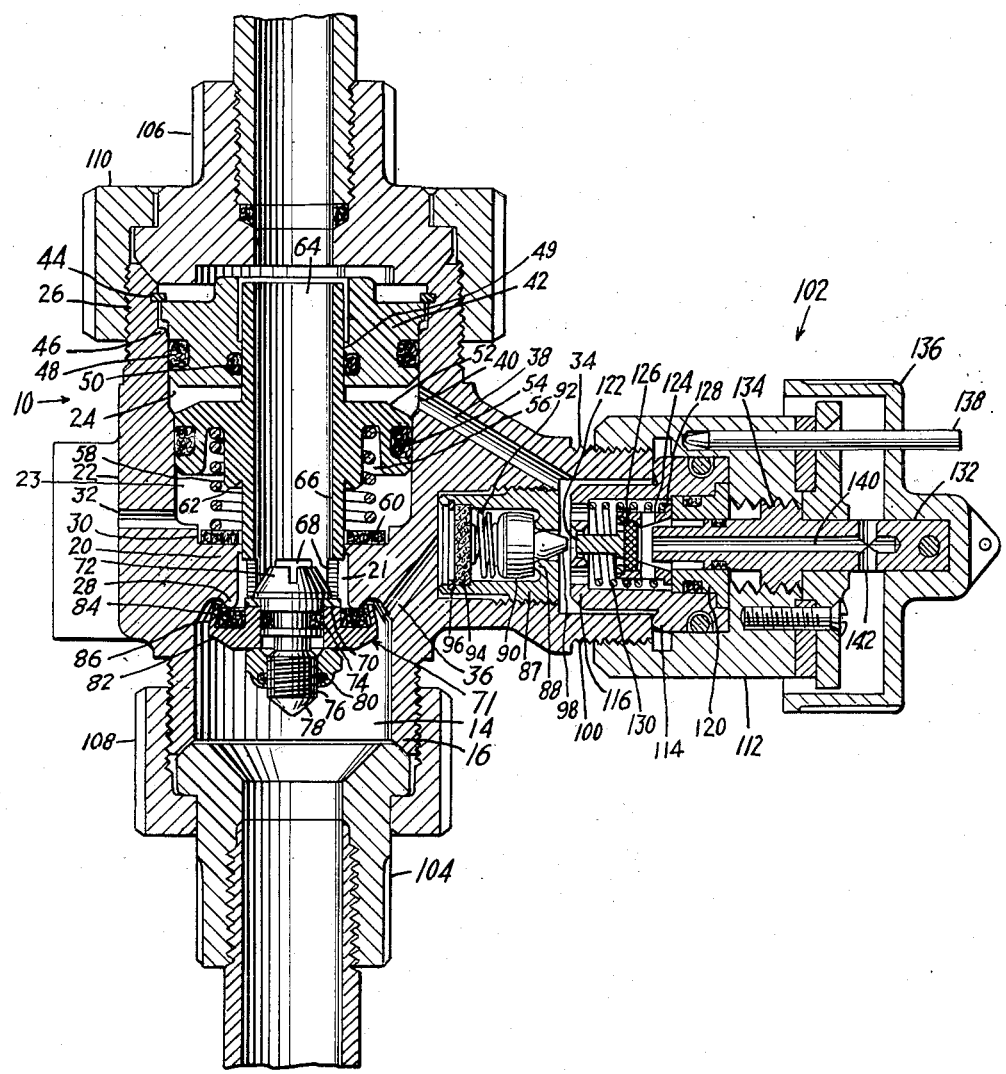
INVENTOR
*Harry C. Grant, Jr.*
BY
*Ernest A. Overman*
ATTORNEY Patented Jan. 9, 1951

2,537,051

UNITED STATES PATENT OFFICE 2,537,051

VALVE

Harry C. Grant, Jr., Ridgewood, N. J., assignor to Specialties Development Corporation, Bloomfield, N. J., a corporation of New Jersey Application June 8, 1946, Serial No. 675,422

3 Claims. (Cl. 137—139)

This invention relates to valves, and particularly to valves for controlling the discharge of fluid media under pressure.

In a valve of the above-indicated character, especially for controlling the discharge of a high pressure fire extinguishing fluid medium, it is essential to provide quick discharge and a high rate of flow where the fire is burning gasoline or the like. In such case, the introduction of the extinguishing medium in adequate quantity within fractions of seconds may be of paramount importance.

Accordingly, an object of the present invention is to provide a valve which facilitates a high rate of discharge therethrough.

Another object is to provide a valve wherein the main discharge flow is straight through the valve, thus eliminating any bend or turn in the flow passage.

Another object is to provide a valve structure of the above-indicated character which is simple and durable in construction, economical to manufacture, and effective in its operation.

A further object is to provide a valve structure which may be utilized as a discharge control head for a fluid pressure medium container and as a direction valve in a fire extinguishing system.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein the single figure is a longitudinal sectional view, illustrating a valve constructed in accordance with the invention.

Referring to the drawing, the valve shown therein comprises a valve body or housing 10 having a straight through opening or bore including a main valve inlet chamber 14 in an exteriorly screw-threaded nipple portion 16, a partition 20 formed with a main valve port 21, and a cylinder 22 at the opposite side of the partition 20 from the chamber 14 having a piston chamber 23, and a portion 24 of slightly larger diameter than the chamber 23 formed in an exteriorly screw-threaded outlet end nipple portion 26. The partition 20 has a valve seat 28 in the chamber 14, and a recess 30 in the chamber 23 adjacent a side wall vent 32 of the housing 10.

The housing 10 has a pilot valve receptacle portion 34 located laterally outwardly of the bore, which is connected by an inlet duct 36 to the chamber 14, and by an outlet duct 38 adjacent the adjoining ends of the chamber 23 and the cylinder portion 24, at 40.

A ring-like retainer member or closure 42, held in the cylinder portion 24, between a locking ring 44 and a shoulder 46 of the housing 10, has an outer groove for a packing ring 48, and a central bore 49 provided with a groove for a packing ring 50.

A piston head 52, disposed in the chamber 23, has an outer groove for a packing ring 54, an underside annular recess 56 for a spring 58 bearing against a sealing washer 60 in the recess 30, an undercut annular lip 62 for engaging the washer 60, and tubular passage means including an outer sleeve portion 64 slidably guided in the retainer member 42 and an inner sleeve portion 66 slidably guided in the port 21 of the partition 20. The inner sleeve portion 66 has side wall aperture means 68 adjacent its free end, and has a centrally apertured base portion 70.

A main valve assembly 71 comprises a screw 72, accessible through the stem portions 64 and 66, which extends through base portion 70 and is provided with a groove for a packing ring 74, a screw-threaded portion 76, and a streamline inner end 78. The assembly further comprises a lock nut 80 threaded on the portion 76 to hold thereon a main valve member 82 having a recess for a sealing washer 84 and a bent-in side wall 86 for holding the washer 84 for engagement with the seat 28.

A pilot valve housing member 87 screw-threaded in position in the pilot valve receptacle portion 34, has a pilot valve seat 88, against which a pilot valve member 90 is held by a spring 92 extending between the member 90 and a porous disc 94 held by a lock ring 96. A short stem 98 of the pilot valve member 90 extends through a port surrounded by a screw-threaded nipple or mounting portion 100 for receiving a control head 102 for operating the pilot valve member 90 and venting the fluid pressure side of the piston 52 through the duct 38 when the pilot valve is closed.

The control head 102 for purposes of illustration may comprise a casing body 112 supported by the mounting portion 100, and enclosing a member 114 of substantially cup-shape having an apertured inner end wall 116, and containing a bushing 120. A plunger head 122, for engagement with the pilot valve stem 98 to unseat the pilot valve member 90, is carried by an apertured body 124 carrying a sealing disc 126 and having an outer end flange 128, between which and the wall 116 a spring 130 extends for normally holding the plunger head 122 in the position shown.

A stem 132, having a portion 134 screw threaded in the casing body 112, has a fixed handwheel 136 normally locked to the body 112 by a pin 138. An axial passage 140 and radial passages 142 in the stem 132 normally provide free venting of the pressure side of the piston 52 from the position 40, through the duct 38, through the apertured end 116, and through the apertures in the body 124 to the passage 140.

It will be understood that other types of control heads may be employed which are adapted to be operated locally or remotely.

Conduit fitting adapters 104 and 106 are secured to the housing 10 on the respective nipple portions 16 and 26 of the housing 10 by nuts 108 and 110, respectively, for connecting the valve to a source of pressure fluid medium, through the adapter 104, and to fluid dispensing means through the adapter 106. By reason of this arrangement, adapters having different size inner bores are adapted to be interchangeably connected to the housing 10, whereby the housing may be connected in conduits of different diameters.

The valve is adapted to be used in fire extinguishing systems as a direction valve, and is also adapted to be used as a container discharge control valve merely by connecting an adapter 104 thereto which is adapted to be secured in the outlet of a container for fluid medium under pressure.

In operation, the piston 52 is normally held in the retracted position, with the main valve member 82 in the closed position, illustrated, by the pressure of the fluid medium on the member 82, and by the spring 58, which avoids the necessity for a spring in the main inlet or valve chamber 14, whereby turbulence normally caused by such a spring is eliminated.

With the pin 138 removed, when the handwheel 136 is turned, the stem 132 advances to first engage the disc 126, thereby closing the venting of the pressure side of piston 52, but leaving the duct 38 open for the passage of the pressure fluid when, upon further advance of the stem 132, the plunger head 122 unseats the pilot valve member 90.

When the pilot valve member is unseated, fluid medium passes from the inlet chamber 14, through the duct 36, past the pilot valve member 90, and through the duct 38 to the position 40 of the cylinder 22 at the pressure side of the piston 52. The latter is instantly moved to open the main valve member 82 and to press the lip 62 against the washer 60, whereby the vent 32 is sealed relative to any fluid pressure through the port 21 in the partition 20. The main discharge of the fluid medium passes through the side wall apertures 68 in the inner sleeve portion 66, through the latter portion, the piston 52, the outer sleeve portion 64 in to the conduit connected to the adapter 106.

If it is desired to stop the discharge of the fluid medium, the handwheel 136 is turned in a direction to move the stem 132 outwardly. This permits the pilot valve member to seat and shut off communication between the ducts 36 and 38, while the medium in the cylinder 22 is vented to the atmosphere through the passage 140 of the stem, thereby enabling the spring 58 to effect closing of the main valve.

From the above description, it is apparent that a novel valve device has been provided, which facilitates a high rate of discharge, with minimum turbulence and retarding effect, which handles fluid presure medium more effectively, and is an improvement generally for extinguishing fires quickly, and in other applications where a high rate of discharge is necessary or desirable.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A valve comprising a housing having a bore extending therethrough provided with inlet and outlet ends and a partition adjacent the inlet end provided with an aperture serving as a valve port and a bushing, a valve seat on said partition at the side facing the inlet end of said bore, a closure at the outlet end of said bore having an aperture serving as a bushing in coaxial alignment with said valve port aperture, a piston in said bore between said closure and said partition having a tubular extension at each side thereof, one of which extends through said aperture of said closure and the other of which extends through said aperture of said partition, said last mentioned tubular portion having lateral openings adjacent its end and a valve member secured on the end thereof for engaging said valve seat, said housing having a passageway extending from the valve seat side of said bore to said bore between said closure and said piston and having a vent extending from said bore between said partition and said piston to the exterior, and a pilot valve member for controlling said pasageway.

2. A valve according to claim 1, wherein a spring is disposed between said piston and said partition for normally urging said piston in a direction to cause said valve member to engage its seat.

3. A valve according to claim 1, wherein said partition at its side opposite said valve seat and said piston having means cooperating to form a seal between said aperture in said partition and said vent.

HARRY C. GRANT, Jr.

REFERENCES CITED

The following references are of record in the file of this patent:

UNITED STATES PATENTS

| Number | Name | Date |
| --- | --- | --- |
| 453,012 | Lonergan | May 26, 1891 |
| 1,631,482 | Gfeller | June 7, 1927 |
| 1,700,111 | Welcker | Jan. 22, 1929 |
| 1,813,581 | Rodrigues | July 7, 1931 |
| 2,097,201 | Renkenberger | Oct. 26, 1937 |
| 2,284,961 | Hall | June 2, 1942 |
| 2,398,775 | Beekley | Apr. 23, 1946 |

FOREIGN PATENTS

| Number | Country | Date |
| --- | --- | --- |
| 483,835 | Great Britain | of 1936 |